United States Patent [19]
Ross et al.

[11] Patent Number: 6,079,922
[45] Date of Patent: Jun. 27, 2000

[54] THREADED INSERT WITH FLANGE TABS

[75] Inventors: Harold D. Ross, Chalfont; William P. McDonough, Royersford; Kenneth Swanstrom, Doylestown, all of Pa.

[73] Assignee: PEM Management, Inc., Wilmington, Del.

[*] Notice: This patent is subject to a terminal disclaimer.

[21] Appl. No.: 09/356,038

[22] Filed: Jul. 16, 1999

Related U.S. Application Data

[63] Continuation-in-part of application No. 09/162,989, Sep. 30, 1998, Pat. No. 5,927,920.

[51] Int. Cl.⁷ .............................. F16B 37/04; F16B 37/16
[52] U.S. Cl. .............................. 411/180; 411/61; 411/437; 470/25
[58] Field of Search .................................. 411/61, 73, 74, 411/180, 182, 433, 437; 470/25

[56] References Cited

U.S. PATENT DOCUMENTS

| 2,823,572 | 2/1958 | Gisondi | 411/74 X |
| 4,354,782 | 10/1982 | Newport | 411/61 |
| 4,430,033 | 2/1984 | McKewan | 411/74 X |
| 5,927,920 | 7/1999 | Swanstrom | 411/61 X |

*Primary Examiner*—Neill Wilson
*Attorney, Agent, or Firm*—Gregory J. Gore

[57] ABSTRACT

An insert for plastic sections is manufactured from a flat strip of metal by high-speed progressive die-stamping, which forms the strip into a threaded female insert. The metal strip is first cut into a flat blank and then thread regions are impressed on the face of the strip, providing a thread pitch profile. During the stamping operation, the strip is folded to form a triangular hollow tube with sharp-edged protrusions extending radially outward from each corner of the triangle. An interlocking side tab and interlocking cutout secure the abutting longitudinal side edges of the strip and ensures axial alignment of the thread regions. As a result of the folding and stamping process, the thread regions lie along the interior wall of the tubular construction and define a thread pitch diameter, which will accept the screw threaded into the center of the insert.

14 Claims, 3 Drawing Sheets

THREADED INSERT WITH FLANGE TABS

This is a Continuation-In-Part Application of U.S. patent application Ser. No. 09/162,989, entitled "Progressiyely-Formed Threaded Insert" filed on Sep. 30, 1998 now U.S. Pat No. 5,927,920, priority from which is hereby claimed.

FIELD OF THE INVENTION

This invention relates to internally threaded metallic inserts installed in plastic housings to provide strong threads in ductile materials. More specifically, this invention relates to an alternate means of producing these inserts that significantly reduces the manufacturing costs.

BACKGROUND OF THE INVENTION

A Present invention relates to U.S. patent application Ser. No. 09/162,989 entitled, "Progressively-Formed Threaded Insert," now U.S. Pat. No. 5,927,920, which was filed on Sep. 30, 1998 and commonly assigned to the present Applicant. That patent application describes a product and method for progressively forming a threaded insert from die stamping and folding a sheetmetal blank. The entirety of said patent application is hereby incorporated by reference, as though fully set forth herein.

A shortcoming of this design, however, is the lack of a flange around the mouth of the insert. Inserts commonly include a flange, which may provide several important functions. For example, a flange at one end of an insert permits the insert to be orientable when used in combination with an automated feed system. Another advantage is that the flange provides a better lead-in for a first engagement thread since it provides a tapered opening around the mouth of the insert. In addition, the flange may provide an important electrical ground contact if the insert is used with a metallically coated substrate. Other advantages of a flange are that it provides a stop to ensure proper insertion depth and also provides a restriction for the material around the outside of the insert as it is installed when it is inserted into flowable material such as plastic. And finally, a flange provides a better appearance of the installed insert. Even though a flange provides all of these advantages, a fully circular flange is impossible to create with the method of forming an insert as described in the above-referenced U.S. patent application, Ser. No. 09/162,989.

Patent prior art of which the Applicant is aware and which is cited in the above-captioned patent application to Swanstrom includes U.S. Pat. No. 3,433,119 issued to Ballantyne et al on Mar. 18, 1969. This reference discloses a longitudinal sheet metal insert with internal and external punched-out barbs for insertion into a plastic material prior to receiving a threaded member. U.S. Pat. No. 3,496,800 discloses a triangularly-shaped sleeve which is internally threaded by pressing a tubular member against an internally-positioned threaded die. U.S. Pat. No. 3,314,509 issued to Olson on Mar. 23, 1943 discloses the use of a longitudinally-folded sheet metal fastener having interrupted threads, which are embossed into the sheet metal. U.S. Pat. No. 3,006,231 issued to Kahn on Oct. 31, 1961 discloses an internally threaded nut formed from longitudinally folded sheet metal where the threads are preformed on the sheet. U.S. Pat. No. 3,532,323 issued to Uhen on Oct. 6, 1970 discloses a laterally folded sheet metal nut having slots cut into the sheet, which receive and engage the external threads of a bolt. U.S. Pat. No. 5,419,043 issued to Laue on May 30, 1995 discloses a longitudinally folded fastener with thread indentations that utilizes an alignment tab. U.S. Pat. No. 1,111,749 issued to C. Joseph on Sep. 29, 1914 discloses a sheet metal insert, longitudinally folded, which employs outward-facing barbs and thread-engaging cutouts. U.S. Pat. No. 4,430,033 issued to McKewan on Feb. 7, 1984 discloses a sheet metal insert for foam plastic, which includes an outward-facing rippled surface and interfacing thread-engaging ribs.

However, none of the above teachings suggest the use of forming an internally threaded insert by progressive impact stamping of sheet material and then folding the stamped sheet to provide a flanged insert. The use of this method of fastener formation permits economies of manufacture, which are heretofore unattainable by any of the known prior art processes for forming threaded inserts.

SUMMARY OF THE INVENTION

The present invention meets the need in the art for a threaded insert of the sheetmetal folded type with a flange, by providing the attributes of a fully formed flange by means of a series of radially-projecting tabs which extend outwardly from the mouth of the insert. While the performance of the flange tabs is less than a fully formed flange, they function acceptably to provide many of its advantages described above.

According to the present invention, a strip is formed into a threaded female insert by progressive die formation. The raw material strip is first cut into a flat blank having a pattern, which includes lancing sharp edge protrusions into the strip along three parallel fold lines. In the next step, three regions on the face of the strip are impressed or otherwise formed with a thread pitch profile. As the formation process progresses, the strip is folded along the fold lines to form a triangular hollow tube. Sharp-edged protrusions radially extend from each corner of the triangle, forming barbs representing the greatest diameter of the tube. The barbs bite into the surrounding material to hold the insert against pull out forces. The barbs are also designed to resist torque applied to the tube via a screw. In order to hold the folded tube in a closed condition to ensure secure engagement of the threaded screw, the blank includes a mating interlocking interlocking side tab and cutout. The interlocking side tab is keystone-shaped and fits into the interlocking cutout so that after folding, the abutting side edges of the strip are locked together to resist separation while it also holds the edges of the strip in axial alignment to ensure registration of the threaded regions. In the final step of folding, the interlocking side tab is pressed into the cutout.

After folding, the threaded regions lie along the interior wall area of the tube, and as a result of the folding process, define thread pitch diameter aligned so that they will accept a screw threaded down into the center of the tube. The resulting triangular tube is sized so that a diameter circumscribing the triangular corners of the insert is slightly less than the diameter of the intended receiving hole, while the barbs extend to a greater diameter than the hole.

A series of flange tabs are provided along the top edge of the sheetmetal blank before the insert is folded. At an intermediate step in the folding process, the tabs are all bent backward in the same direction such that when the metal blank is folded, the tabs project radially outward around the edges of the mouth of the insert. These tabs function much like a fully encircling flange, providing the desired flange attributes described above. In addition, when the insert is pressed into very soft materials, the flange tabs may also become embedded in the surface of the surrounding material, further providing the advantage of greater torque-out resistance.

In aspects other than the inclusion of the flange tabs, the present folded-insert is much the same as the Swanstrom device presented in patent application Ser. No. 09/162,989 and, as will be described below, is formed by the same methodology utilizing progressive die-stamping. The inclusion of the flange tabs does not restrict any of the other features or attributes of the Swanstrom folded-insert. Other advantages of the flange tabs in combination with the folded insert of the present invention will be made apparent to those of ordinary skill in the art from the following drawings and description of the preferred embodiment.

BRIEF DESCRIPTION OF THE FIGURES OF DRAWINGS

DESCRIPTION OF THE PREFERRED EMBODIMENT

Figure 1:
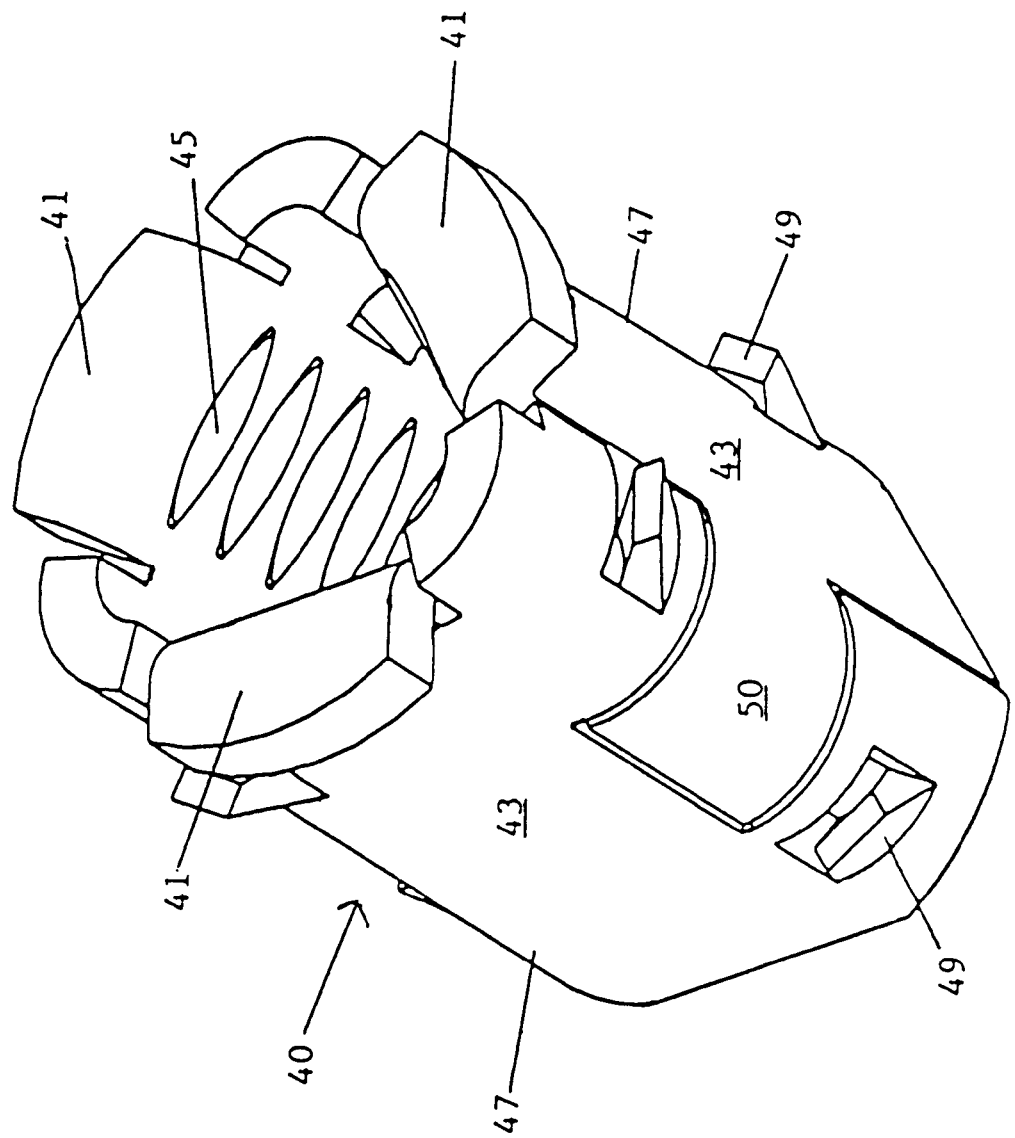
FIG. 1 is a top front isometric view of the fastener insert of the present invention.

Referring now to FIG. 1, a fully formed insert 40 of the present invention is shown. The fastener is formed by progressive die stamping and folding a blank of sheet material along three foldlines to form a triangular closed tube having sides 43. Thread impressions 45 are also made into the surface of the blank when folded into a closed tube. The impressions provide thread-engaging surfaces for a screw threaded down the center of the insert. Corners 47 are formed by the folding operation described in more detail below and include outward-facing barbs 49 which project radially from each corner. Ends of the folded blank are held together to maintain the insert in its folded condition. An interlocking side tab 50 locks together abutting side edges of the folded material and also maintains the axial alignment of the threads of the three sides of the triangular tube. A unique feature of the present invention is the inclusion of flange tabs 41, which project radially outward from the area around the mouth of the insert.

Figure 2:
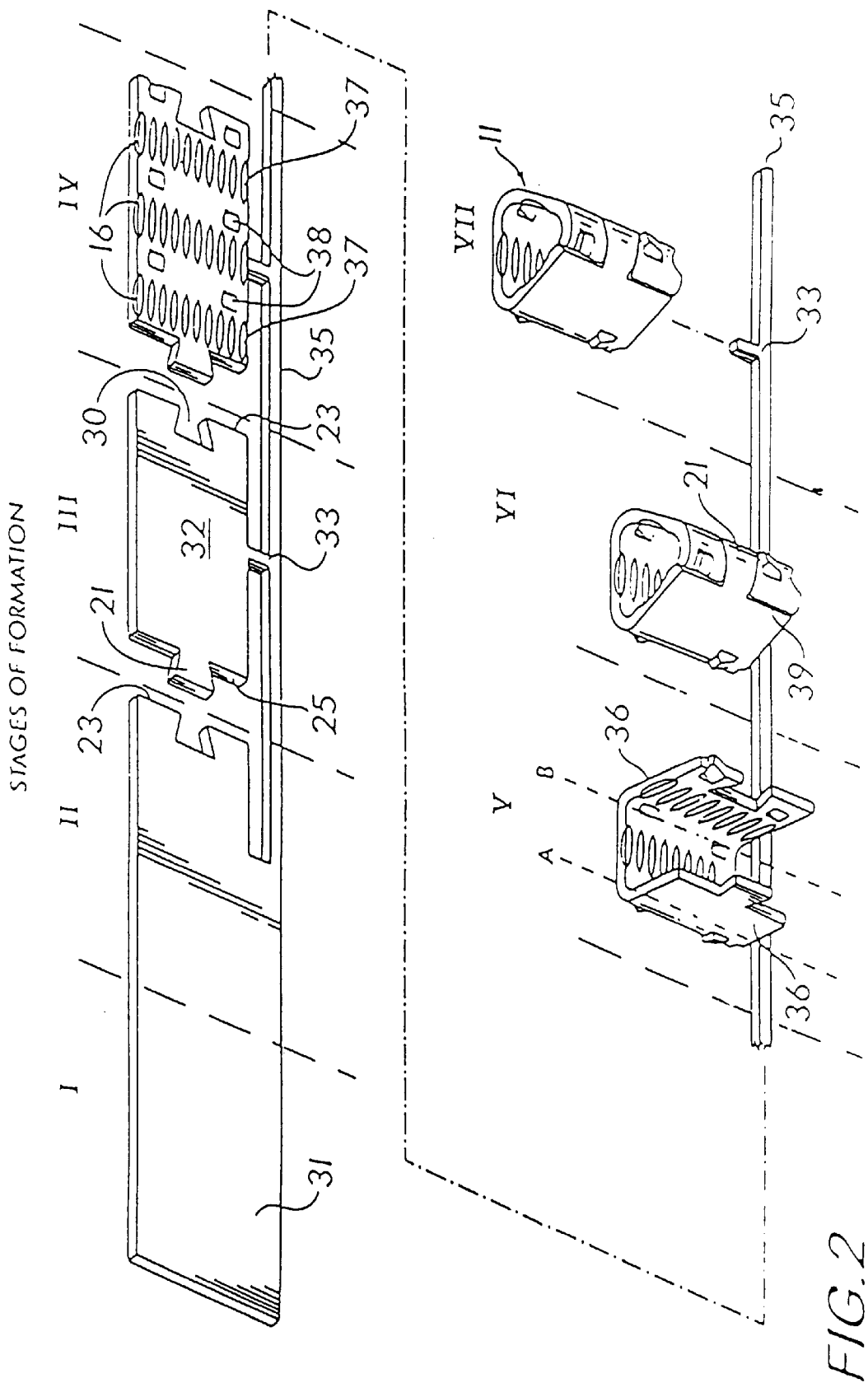
FIG. 2 is a top left isometric view of a fastener insert shown in various stages of sequential formation.

Referring now to FIG. 2, the various stages of formation of a folded insert as disclosed in the above-noted patent application to Swanstrom, which is shared with the present invention, is depicted. Shown as Stage I, the fastener begins as a flat strip of stock 31 composed of a suitable material, such as brass. At Stage II, the strip 31 begins being cut out first on the leading edge 23, which includes interlock cutout 30. Then, the trailing edge 25 is cut, resulting in a blank 32 shown in Stage III. At this stage, the perimeter of an individual insert blank is fully formed with one side edge including a keystone interlocking side tab 21, and the other side edge including an interlocking cutout 30 in a keystone shape corresponding to the tab. In this preferred embodiment, the interlocking side tab is in the shape of a keystone, but other locking shapes may also be employed. Throughout the process, frangible tangs 33 connect the body of the individual fastener blanks to a carrier strip 35 which is an unformed portion of the strip that lies along the bottom edge of the material. An additional carrier strip (not shown) may be included along the top edge of the material. The carrier thus will continue to hold each individual fastener, even after formation. Individual fasteners may later be severed from the strip when installed.

At Stage IV, the fastener has been further formed by embossing three lead-in chamfers 16 and three longitudinal thread regions 37 into the front face of the blank. Also formed at this stage are barbs 38 created by punching and folding out three-sided cuts through the blank. At Stage V, the blank is then folded along two foldlines A and B which brings the fastener into a U-shape with two parallel sides 36. At Stage VI, the ends of the sides 36 are brought together at seam 39 and interlocking side tab 21 is folded over and inserted into the cutout 30 on the opposite side of the blank, thus holding seam 39 closed. Insert lead chamfers are formed into the rear side of the blank by a die so that they occur at the outside bottom of each corner. Stage VII shows the completed fastener 11 separated from tang 33 now ready for installation.

Figure 3:
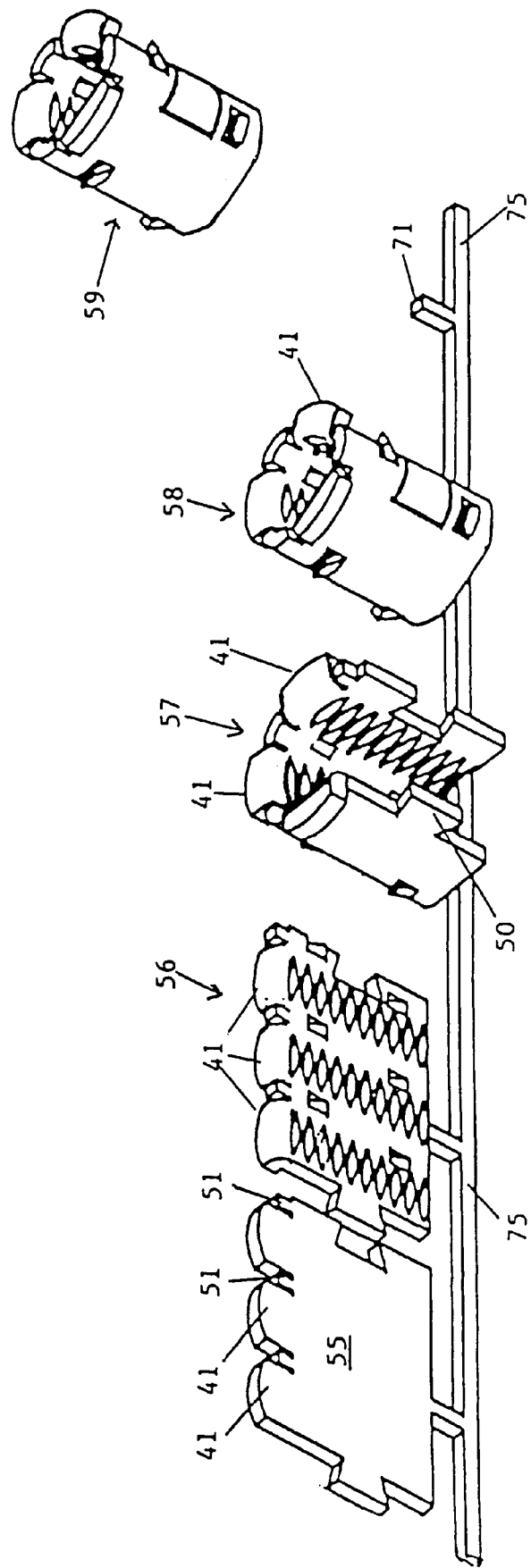
FIG. 3 is a top left isometric view of the present invention in various stages of sequential formation.

FIG. 3 shows the present invention which adds flange tabs 41 along the top surface of the folded blank that is otherwise structurally the same as and produced in the same way as described with regard to the folded insert in FIG. 2. When the blank is first cut, flange tabs 41, having rounded top edges separated by interstitial projections 51 are formed. These projections establish a wall height between the tabs, which occur along the fold lines of the blank. The shape and location of these structures is shown at the stage of formation of blank 55. The next stage of formation is depicted by partially formed fastener 56. At this stage, the threaded regions are impressed and the barbed projections are cut into the blank. The tabs 41 are folded backward at the same time. At the next stage of completion, as shown by fastener 57 the metal blank is folded along the two intermediate fold lines so that the folded tabs 41 now project outwardly from the axis of the fastener which at this state of production is only partially folded. In the next step, the folding is completed and the keystone-shaped interlocking side tab 50 is fitted within the interlocking cutout so that the insert is thus fully formed. At this stage, the flange tabs project radially outward from the mouth of the fastener. This is shown by fastener 58. Finally, as depicted by fastener 59, the fully formed fastener is separated from one of the tangs 71, which hold all of the partially formed inserts to carrier strip 75.

It will be understood by those of ordinary skill in the art that the main object of the present invention to include structures which produces a functional flange along the mouth of a progressively formed folded insert has been achieved. For example, the present invention may include a closure at the bottom similar to the fastener shown in FIG. 2. This has been done economically and effectively by merely altering the previously known shape of the material blank corporating a tab-folding step into the die impact step in which the thread engaging regions are formed. Other uses, advantages, and modifications to the present invention, which shall be limited only by the following claims and their legal equivalents.

What is claimed is:

1. A threaded metal insert, comprising:
    a tube-like channel having a polygonal cross-section and being comprised of a plurality of planar longitudinal faces intersecting at corner areas;
    a plurality of flange tabs each located at an end of lock of said faces and extending radially from a mouth of said channel such that the flange tabs collectively define the greatest outside diameter of said insert; and
    a plurality of thread regions comprising longitudinal rows of indentations on inside surfaces of each of said planar faces.

2. The insert of claim 1, wherein said cross-section is triangular.

3. The insert of claim 2, further including a closure at the bottom of said insert, said closure being an extension of one planar face folded laterally inward at the bottom of said one side.

4. The insert of claim 1, further described as a folded strip of material having first and second side edges which meet in abutment along a longitudinal seam.

5. The insert of claim 4, wherein said first side edge includes a cutout and said second side edge includes an interlocking side tab corresponding to said cutout whereby said seam is held together by inserting said interlocking side tab into said cutout.

6. The insert of claim 5, further including insert lead chamfers located at the bottom outside edge of each of said corner areas.

7. The insert of claim 6 further including a plurality of interstitial projections each of said projections extending longitudinally from a top edge of said material strip and being located between adjacent flange tabs.

8. The method of forming a threaded metal insert, comprising a tube-like, elongate channel of polygonal cross-section and a plurality of substantially planar faces with corners having barbs protruding therefrom, comprising the steps of:

providing an elongate strip of metal;

cutting said strip into fastener blanks, each blank having leading and trailing side edges;

embossing said fastener blanks with arcuate indentations into a front surface thereof, said indentations arranged in spaced longitudinal rows;

folding backward a plurality of flange tabs located along a top edge of said blank; and folding said blank into a tube-like channel along longitudinal fold lines located between said rows of indentations such that wells of said indentations define chordal sections of a space corresponding to an externally-threaded member.

9. The method of forming a threaded insert of claim 8, wherein said step of embossing further includes the simultaneous punching and folding out of areas around said fold lines producing outwardly-projecting barb-like structures protruding from an opposite side surface of said blanks.

10. The method of forming a threaded insert of claim 9, wherein a first side edge of said blank includes an interlocking side tab, and an opposite side edge of said blank includes a cutout corresponding to the shape of said interlocking side tab.

11. The method of forming a threaded insert of claim 10, further including the step of inserting said interlocking side tab into said cutout to hold said side edges in a fully-folded condition, said edges being in abutment along a longitudinal seam.

12. The method of forming a threaded insert of claim 11, further including a final step of laterally folding a cap portion of said blank which extends from the bottom edge of one of said planar faces, said cap portion substantially closing an opening at the bottom of said insert after lateral folding.

13. The method of forming a threaded insert of claim 12, wherein after folding, said flange tabs collectively define the greatest outside diameter of said insert.

14. The method of forming a threaded insert of claim 8, wherein all of said fastener blanks remain connected to a common carrier portion of said strip after formation.

* * * * *